United States Patent [19]

Groetschel

[11] 4,369,362
[45] Jan. 18, 1983

[54] RECORDER CONTROL APPARATUS AND METHOD

[76] Inventor: Karl M. Groetschel, Montsalvatstrasse 1 a, D-8000 München 19, Fed. Rep. of Germany

[21] Appl. No.: 150,661

[22] Filed: May 16, 1980

Related U.S. Application Data

[63] Continuation-in-part of Ser. No. 929,126, Jul. 28, 1978, Pat. No. 4,222,069.

[51] Int. Cl.³ ............................................. G06K 21/06
[52] U.S. Cl. .................................. 235/495; 235/487; 235/494; 235/454
[58] Field of Search .................. 283/55; 235/454, 494, 235/495, 487; 200/46; 358/127

[56] References Cited

U.S. PATENT DOCUMENTS

3,215,791 11/1965 Fontaine ............................. 200/46
4,044,229 8/1977 Samreus ............................. 200/46
4,195,773 4/1980 Ogden ............................. 235/495

Primary Examiner—Harold I. Pitts
Attorney, Agent, or Firm—Spencer & Kaye

[57] ABSTRACT

A method of controlling the operation of a recording apparatus for recording video and/or audio signals received in a television and/or radio receiver wherein a data carrier having one or more command tracks associated with a time track and preferably one or more information tracks, is marked by the user in the command tracks to identify programs to be recorded, and the data carrier is scanned along the or each command track in conformity with elapse of time during the day to generate signals for switching on the receiver and selecting the appropriate receiver channel. The invention also includes provision of a data carrier having said tracks. The invention also includes an apparatus comprising scanning means having sensors for sensor user markings in respective command tracks, and switch circuit means responsive to sensor output to switch on the receiver and select appropriate channels.

8 Claims, 10 Drawing Figures

RECORDER CONTROL APPARATUS AND METHOD

This application is a continuation-in-part of my application Ser. No. 929,126, filed on July 27, 1978, now U.S. Pat. No. 4,222,069 issued on Sept. 9, 1980.

BACKGROUND OF THE INVENTION

Field of the Invention

The use of magnetic recording equipment in combination with radio and television receiver sets has become increasingly popular in recent years for selective reproduction at any desired time of particularly interesting programmes. In the case of video recorders the primary incentive for the buyer of such comparatively high priced equipment is the wish to record programmes which he may be unable to see or hear at the time of their actual transmission. Since it also happens very often that no one is available to switch the recording equipment and associated receiver set "on" and "off" at the time in question, it is common practice to use time-switch means which automatically switches the recording equipment and the receiver "on" and "off" at the preselected programme transmission times. The currently most commonly used time switch means for this purpose is the so-called time-switch clock, which, when appropriately set up, e.g. by means of plug and socket contacts, make and break a feed circuit at preselected points in time. However, time-switch means of this type is comparatively complicated to operate, can be pre-set for periods of up to 12 hours only, and will work only for one pre-selected transmission channel, in the sense that the associated receiver can be left pre-tuned to only one chanel.

By contrast, it is the aim of the present invention to replace these conventional time switch means with a system which is simple and convenient to operate by the user, allows longer pre-setting periods than a conventional time-switch clock, and offers the additional facility of sequential selection over its period of operation from different transmission channels.

SUMMARY OF THE INVENTION

According to one aspect the invention resides in provision of a data carrier comprising a sheet having:
a. means defining at least one information track marked with data identifying a sequence of television and/or radio programmes to be transmitted over a channel pertaining to that track,
b. means defining at least one command track associated with the information track for receiving a users marking appropriately positioned to select one or more of the programmes or part thereof,
c. scanning speed control means to enable the sheet to be scanned by means for sensing the marking or markings in a direction corresponding to the sequence of programme data and in synchronism with the elapse of time over the interval when the sequence of programmes is transmitted.

The scanning speed control means may comprise a time track having a sequence of index means along said time track representing the elapse of time. Preferably the index means comprises visible marks on the data carrier collectively defining a time scale.

In a preferred form a plurality of said information tracks are provided on the data carrier, and a plurality of said command tracks are provided on the data carrier each associated with a respective one of said information tracks. Thus, in one arrangement each command track extends parallel to and lies adjacent to its associated information track.

Instead of having a separately defined command track part of one of the other tracks may be used for this purpose. Thus, such a data carrier would preferably include an indicating means, such as an arrow appropriately positioned to indicate a longitudinally extending zone of the time track or the information track which should in effect be used also as a command track.

Data carrier sheets are already in use for feeding information to accounting machines (U.S. Pat. No. 3,639,732). These existing data carriers can be inscribed in relatively adjacent data channels or columns by application of a simple code and are subsequently read and evaluated in a data processing device provided with a reading or scanning head U.S. Pat. No. 3,684,864.

The use of a data carrier according to the present invention, instead of an adjustable time switch clock with mechanical contacts, greatly improves the ease of operating the recorder and receiver or receivers whilst also providing expanded time and channel selection facilities. A data carrier in accordance with this invention may be distributed or sold, for example, as part of a broadcasting programme sheet or newspaper. The transmission in each channel would be printed in vertical programme sequence in a respective information track, or column, whilst the parallel time track, or column would receive the associated transmission time entries and the length of the time track with associated information track would be selected to be proportional with transmission time for a given programme. The user of such a printed data carrier sheet would have to do no more than tick, underline, or side line in the parallel command column, which, as more specifically mentioned, may also be combined with the time track, at least the start and end of the programme(s) to be recorded in a form which can be picked up by the sensor of a scanning head of the appratus hereinafter described. For example, a readable marking of this kind for sensing by a head having one or more photo-electric sensors is a simple pencil stroke or tick at the starting and stopping times of the programme in question. For a magnetic scanning head suitable magnetic paste pens, or the like, would be used to mark the "on" and "off" times on the data-carrier sheet.

Such a data carrier may comprise a portion of a sheet of a newspaper or Journal having the information and time tracks already referred to, and either a separate command track for the or each information track or else an means, such as an arrow, indicating a zone of the time or information track concerned which is to receive the users marking performing the command function. The portion, or each portion of such data carrier which contains tracks pertaining to one channel of the television and/or radio programme as a whole, may be connected with the remainder of the newspaper or Journal sheet by readily rupturable or tearable means such as a perforated zone of the sheet.

In principle, the effect which is aimed at by the present invention is the correctly timed starting and stopping of the recording apparatus and of at least one associated receiver set to receive the appropriate channel. triggered off by manually inscribed commands. This may also be obtained by using a data carrier sheet without a separate information track, that is to say a sheet which is provided only with time and command tracks. The information track on which the manual entries will depend is, or will be, detached from the data carrier sheet before this is introduced into the scanning head. For preference a data carrier of this type which comprises only the tracks which are significant for the functioning of the scanning head is detachably connected with at least one information track containing details of the programmes. The connection may be by tear-off means, e.g. perforated lines, unilateral attachment, e.g. at the top of the sheet, or suitable adhesive connection. However, the provision of one or more information tracks on the data carrier offers the advantages of giving a comprehensive display permitting visual checking at all times.

Moreover, parallel with the track associated with one programme channel, programmes transmitted over a second, third or more channels may be printed on the same data carrier. The time column or track may be the same for all channels. Given a suitable clock means for time synchronisation between the data carrier's progression relative to scanning means, a single data carrier can be used to determine selection of programmes and channels for as long as several days ahead.

BRIEF DESCRIPTION OF THE DRAWINGS

The invention will be hereinafter more specifically described with reference to the accompanying drawings wherein.

DESCRIPTION OF THE PREFERRED EMBODIMENT

Figure 1:
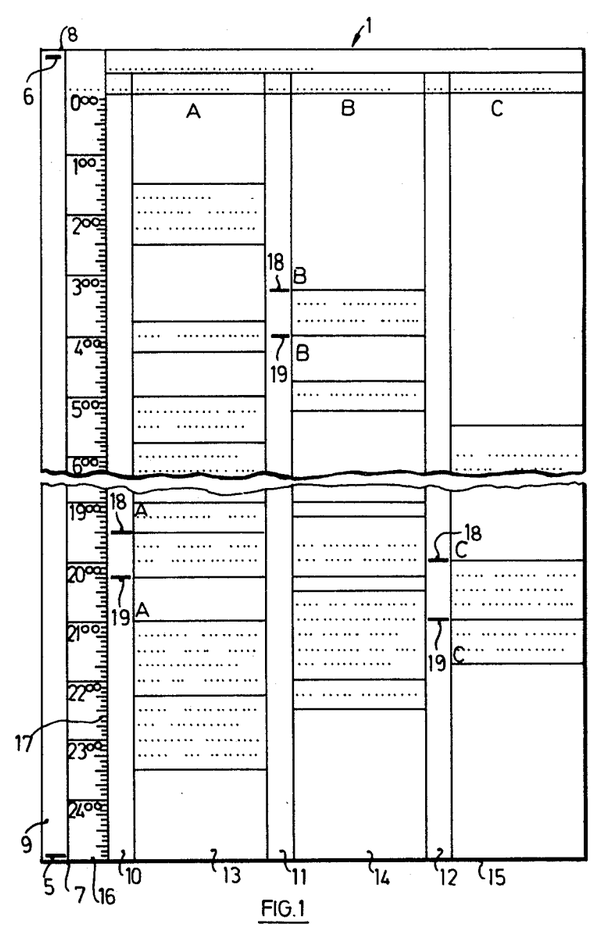
FIG. 1 shows a plan view of one form of data carrier in accordance with the invention for carrying out the method thereof.
Figure 2:
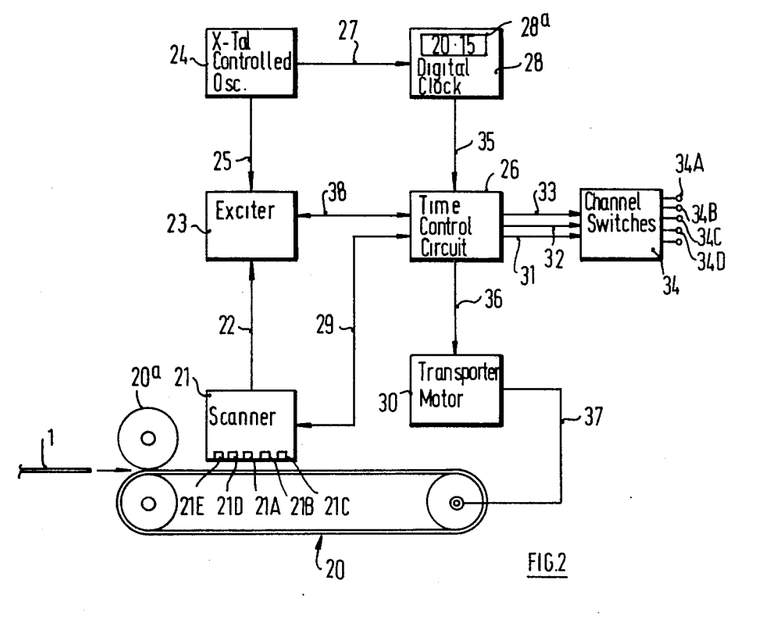
FIG. 2 shows one embodiment of apparatus in accordance with the invention for which the data carrier of FIG. 1 is suitable.

Reference is made firstly to the data carrier shown in FIG. 1 and the apparatus shown in FIG. 2. FIG. 1 is a schematic plan view of a data carrier sheet or strip which may be used for starting and stopping a video recorder as well as for channel or programme selection from an associated television receiver over a period of 24 hours. The data carrier 1 comprises, in laterally adjacent parallel disposition, a number of tracks or columns (herein referred to as tracks) including start/stop track 9, a timing track 16, a first command track 10, a first information track 13, a second command track 11, a second information track 14, a third command track 12, and a third information track 15. In the information tracks 13, 14 and 15, the respective programmes to be transmitted are printed or inscribed in directly readable form in precise coordination with the relevant times which are printed or inscribed in boxes, or areas, which are respectively opposite to the times at which the programmes are transmitted with reference to the time track 16. As shown the time track 16 has graduation marks 17 transverse to the length of the track and collectively forming a time scale.

The successive programmes listed on the data sheet for the whole time period corresponding to the time track 16 can be checked at any time desired and the user can mark, for example by ticks or by side lining or horizontal lines as shown in the command columns 10, 11, 12, those programmes which he wishes to be recorded by the video tape recorder, the marking identifying the starting times 18A, 18B, 18C and the finishing times 19A, 19B, 19C respectively of the selected programmes. The device illustrated in FIG. 2 is associated with a recorder and scans the command columns 10, 11 and 12 concurrently in timed or synchronised relation with the actual transmission times of the programmes and generates "on" or "off" command signals in accordance with the command markings such as 18A and 19A respectively. Programme selection is effected in accordance with the particular command track 10, 11 or 12 in which marking is made and which results in generation of a respective command signal. For convenient reference the three transmission channels are designated A, B, C and these references are marked on appropriate tracks on the drawing.

The data carrier 1 which in the illustrated embodiment of the invention is laid out for a 24 hour day may be adapted for longer periods, e.g. a whole week, by a corresponding extension of its length in the direction of the tracks. Furthermore, a larger number of information tracks containing programmes of respective transmission channels may be accommodated on the data sheet if desired.

The data carrier may, and preferably has, a further stop/start track 9, the leading and trailing edges 8, 7 or marks 6, 5 of which are used to start/stop the apparatus hereinafter described.

Referring to FIG. 2, this shows a control apparatus for bringing an associated recording apparatus and a television and/or radio receiver into and out of operation at pre-selected times, and on pre-selected channels. The apparatus comprises a transporter means here shown as an endless belt 20 and cooperating in-feed roller 20a. The transporter means may, alternatively, be a device of the kind described in the above mentioned U.S. Pat. No. 3,684,864 with a pair of cooperating endless transport strips or belts.

The data carrier 1 is inserted by its leading edge 8 into the transporter means. The row of graduation marks 17 provided on the data carrier, e.g. an appropriate scale on the time track 14, provide for positive carrier drive.

The time scale graduation marks 17 are preferably in the form of thin lines or strokes which can be scanned by a reading or scanning means of the control apparatus, firstly to provide signals for advancing the data carrier relative to the scanning means to a position corresponding to the time of day at which it is inserted, and thereafter for advancing it at a speed correlated with the passage of time during the day.

The apparatus includes a scanning head 21 which in combination with the transporter means forms a scanning means. The scanning head 21 is provided with sensing means comprising a row of sensors extending at right angles to the direction of travel of the upper run of the belt 20. The sensors may be photo-sensitive elements such as photo-transistors. In FIG. 2 the sensors 21E and 21D, 21A, 21B, 21C, respectively positioned for sensing only the leading and trailing edges 8, 7 of the sheet or marks adjacent thereto 6, 5; and tracks 16, 10, 11, and 12, are shown diagrammatically as being spaced apart parallel to the direction of travel of the carrier, but it will be understood that in practice they lie in a row which is at right angles to this direction. As soon as the data carrier 1 comes into register with the sensors a trigger signal is generated by sensor 21A in the scanning means 21 and fed to an exciter or driver 23. This exciter or driver 23 receives a constant frequency input signal from a crystal-controlled generator 24 via line 25 and uses this signal to activate a time control circuit 26.

The constant frequency generator 24 is also connected via line 27 to a digital clock 28, which preferably has a display 28a showing the time of day, and in which stepping signals representing seconds, minutes, and hours, are generated, e.g. by means of suitable frequency divider circuits of the clock fed from generator 24.

After activation of the exciter or driver circuit 23 the time control circuit 26 provides a check or repeat signal which is fed to the scanning head 21 via line 29 and effectively de-activates the sensors which respond to inscriptions in the command columns by blocking their signals to the exciter or driver circuit 23. At the same time the time control circuit 26 starts to drive motor 30 via line 36 connected mechanically as indicated at 37 to a drive roller or sprocket of the transporter belt 20. The belt is started or actuated and the data carrier 1 is rapidly advanced by a drive signal derived from generator 24 via line 25 to exciter 23 and line 38 to time control circuit 26. This continues until the sensors of the scanning head 21 which scan the time track 14 and command tracks 10, 11, 12 are lined up with the time marks 17 on the data carrier which corresponds to the time of day measured by the digital clock 28 and transmitted to the time control device 26 via line 35. This position of the data carrier relatively to the scanning head 21 is determined by means of binary counters and a comparator in the time control device 26. The correct position is established for the data carrier as soon as a counter driven by the exciter 23 receiving input signals from the sensor counting graduation marks 17 in time track 14 has counted up to the same value as another counter driven by the digital clock 28, the signals in each case representing the same intervals of time.

When this position has been established the fast transporter drive is switched off in the time control circuit 26 whereupon the time control circuit 26 controls drive 30 proportionally with the digital clock signals. At the same time the repeat or check signal in line 29 which blocked the sensor signals is interrupted, and a blocking signal is fed by the time control circuit 26 to the exciter 23 via line 38 which interrupts the up to then continuous driving signal input.

At this stage the data carrier 1 is transported further in synchronism with the elapse of time during the day and constantly scanned for command marks. Whenever a command mark 18A, 18B or 18C is sensed in one of the three command tracks 10, 11, 12, the exciter 23 is re-activated and issues a command signal to the time control circuit 26 which in turn feeds a starter signal to one of the three lines 31, 32 or 33. The particular one of these three lines 31, 32, 33 which will receive the signal depends on the particular command track 10, 11, 12 which contains a command inscription thereby causing an associated one of the sensors 21A, 21B, 21C to provide a signal to the exciter and time control circuit. By means of these conductor lines 31, 32, 33 switch means 34 associated with the recording apparatus and the receiver set is actuated.

The switch means 34 includes separate switching channels leading to output terminals 34A, 34B, 34C for connection to the channel switch circuits of the television receiver and has switch terminals 34D for switching the receiver as a whole "on" and "off".

The second command mark 19A, 19B or 19C triggers the "off" command whereupon the data carrier 1 continues its time-synchronised advancement through the otherwise non-activated device until either a new "on" mark is scanned or the sensor 21E of the scanning head 21 senses the trailing edge 7 or mark 5 of the data carrier 1. In the latter event data carrier transport will continue up to a suitable discharge point whereupon the motor 30 for the transport means 20 is switched off.

Figure 3:
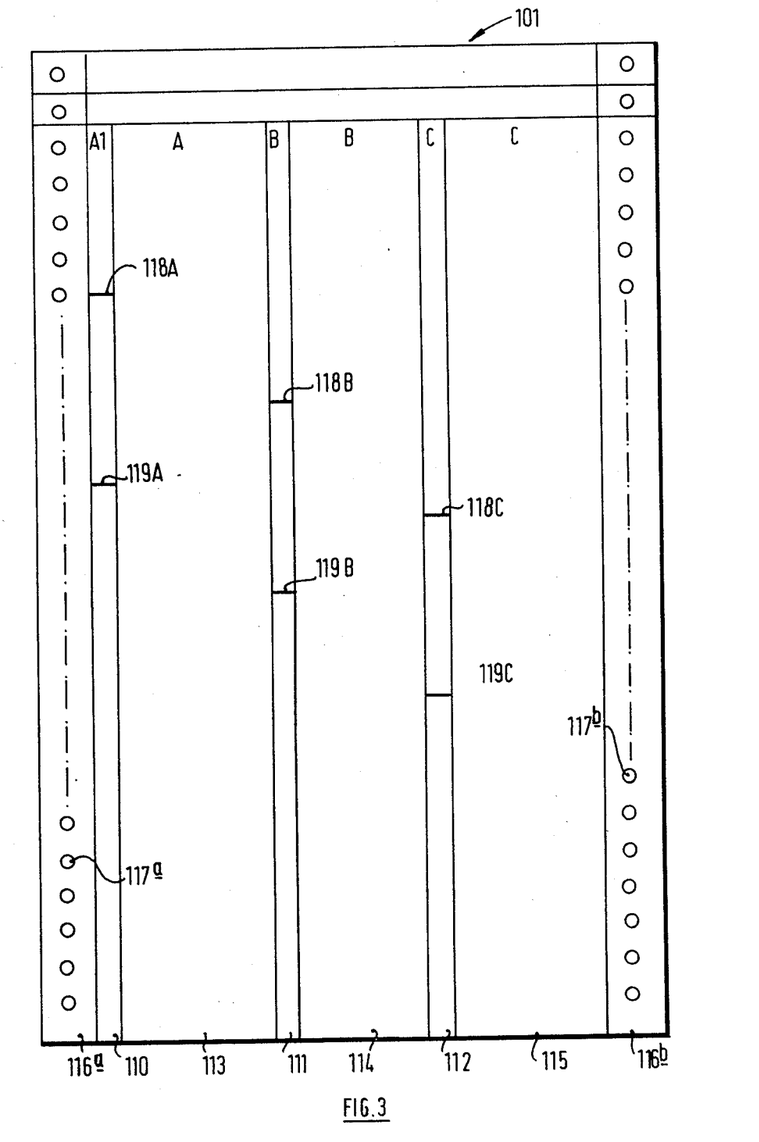
FIG. 3 shows a plan view similar to FIG. 1 of a further form of data carrier.
Figure 4:
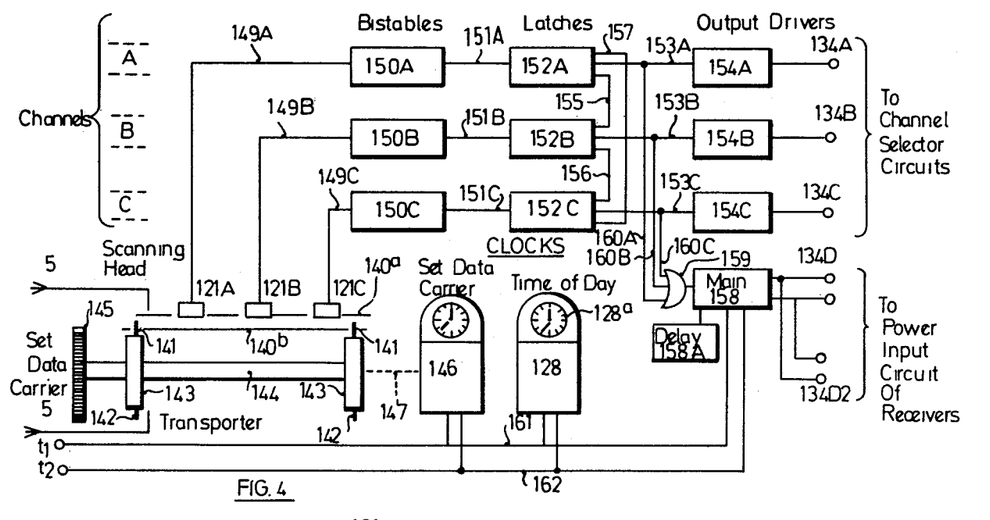
FIG. 4 shows a further embodiment of the apparatus for which the data carrier of FIG. 4 is suitable.
Figure 5:
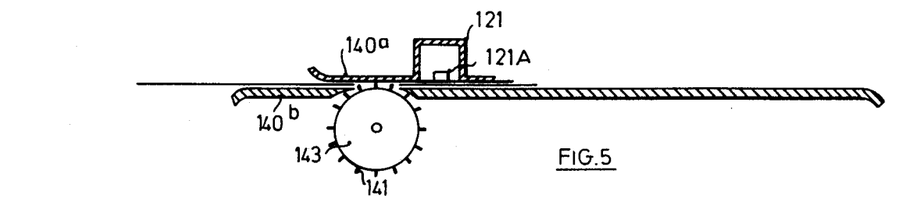
FIG. 5 is a fragmentary view of the scanning means in section on the line 5—5 of FIG. 4.

Referring now to FIGS. 3, 4 and 5, these illustrate a simplified form of data carrier and apparatus. Parts which are equivalent to those previously described are denoted by like references with the prefix 100. The latter includes a scanning means constituted by the combination of a transporter means 120 and a scanning head 121 having photo-electric sensors 121A, 121B, 121C for scanning respective command tracks of the data carrier 101.

The transporter means 120 comprises upper and lower guide plates 140a, 140b, the latter having apertures 141 in its lateral margins through which extend the teeth or pins 142 of a pair of drive wheels 143. The wheels 143 are fixed on a shaft 144 on which is also fixed an adjusting knob 145 to enable the shaft to be rotated manually. The shaft is driven from a synchronous motor incorporated in "set data carrier" clock 146. The latter is connected mechanically to the shaft 144 by a coupling 147, shown diagrammatically in dashed lines, and includes a display means such as an analogue dial and hands 146a, or a digital display unit if desired.

The apparatus further comprises a "time of day" synchronous motor clock 128 having a display means 128a similar to that of clock 146 and is preferably mounted adjacent to the latter.

Both clock motors are of the self-starting type and are powered from a suitable A.C. source having a frequency of 50 Hz or 60 Hz applied at terminals t1, t2.

The photo sensors are connected to form inputs to respective electrical channels pertaining to transmitting channels A, B, C for which programme data would be printed in information tracks 113, 114, 115. These electrical channels comprise conductors 149A, 149B, 149C, bistable circuits 150A, 150B, 150C, conductors 151A, 151B, 151C, latch circuits 152A, 152B, 152C, conductors 153A, 153B, 153C and output driver circuits 154A, 154B, 154C.

The driver circuits have respective output terminals 134A, 134B, 134C. The output terminals would in use be connected, as before, to channel switching circuits of the receiver. A channel switching circuit may be switched off when its associated terminal such as 134A is low ("0") and switched on when such terminal is high ("1"). If the channels are normally switched by pushbutton operated switches on the receiver, the connections to the channel switching circuits would be at points therein such as to override any prior selection by the push-buttons, or the user may be instructed to ensure that all push-buttons are in unoperated positions. In other cases the receiver channel switches may be of the "touch" or proximity type and the signal "1" supplied from the appropriate terminal may then correspond to a finger "touch" and absence of the finger respectively.

The latch circuits 152A, 152B, 152C have interconnections via conductors 155, 156, 157 which hold open the electrical channel which first receives an input from its associated sensor and closes the remaining channels to any signals provided by their sensors should the user inadvertently have marked the command tracks 110, 111, 112 with time-overlapping marks.

The bistable circuits 150A, 150B, 150C may be of a form to be switched from one stable state to the other in response to sensing of marks such as 118A, 118B, 118C and back to the first state in response to sensing of marks such as 119A, 119B, 119C, or if the marking is intended to be in the form of a side line the bistable circuits may be switched from the first to the second state by the sensing of the (dark) side line and revert to the first state when the line ceases, i.e. the command track is unmarked (light).

To effect switching-on and switching-off of the associated receiver or receivers, a main switching circuit 158 is connected through an OR gate circuit 159 and conductors 160A, 160B, 160C to the electrical channels. Preferably it is provided with a plurality of pairs of output terminals 134D$_1$, 134D$_2$ which become "live" at the mains voltage when a channel is selected. The clocks and main switch circuit are connected to the mains supply terminals by conductors 161, 162.

The main switch circuit preferably incorporates a delay circuit 158a to delay switch-off for a short period of typically 1 to 5 seconds.

The function of the time track in the system shown in FIGS. 1 and 2 is performed in the system of FIGS. 3 to 5 by tracks 116a, 116b which have performations 117a, 117b at positions spaced apart therealong corresponding to intervals of time between arrival of successive teeth or pins 142 at the topmost point of their travel. Thus, by meshing the teeth or pins 141 with these perforations, positive drive of the data carrier is established past the scanning head 121 at a speed corresponding to the elapse of time during the day. The spacing between successive perforations may, for example, represent intervals of 5 minutes, being also the time between arrival of successive pins at the topmost position.

In operation the user first sets the clock 146 to zero, i.e. 1200, and then inserts the leading end of the data carrier to mesh its perforations with the teeth or pins 142 of wheels 143 while still holding the shaft 144 stationary by means of knob 145.

The knob 145 is then rotated by the user driving the display 146a until it registers the same time as the display 128a of the "time of day" clock. If the display means is in the form of a 12 hour analogue (hands display) one complete pre-rotation of the hour hand of display 146 will be necessary if the data carrier is inserted after 12 noon.

The user releases knob 146 and clock motor of clock 146 then drives the data carrier past the row of sensors of the scanning head.

When a sensor such as 121A senses a mark such as 118A bistable circuit 150A is set to its second state, latch circuit 152A holds the "A" channel open and closes the "B" and "C" channels. The output, e.g. "1", at terminal 134A selects channel A at the receiver, and terminals 134D$_1$, 134D$_2$ become "live" to switch on the receiver.

When mark 119A passes the sensor 121A bistable circuit 150A is switched back to its first state, latch circuit 152A reverts to an inoperate state and all three channels A, B, C are free to become operative.

If, during the time interval 118A, 119A, another mark such as 118B has passed its sensor 121B, then bistable circuit 150B will have become switched to its second state and will, as soon as latch circuits 152A, 152B, 152C are freed, enable latch circuit 154B so that for the remainder of the time interval represented by 118B, 119B terminal 134B will have a "1" state and switch the receiver to channel B without the receiver being switched off, due to provision of the delay circuit 158a.

If, however, there is no time overlap between marks in the command channels or no immediate follow-on in another command channel, the receiver will be switched off by main switch circuit 158. The motor of clock 146 will continue to drive the data carrier 1 until it moves out of mesh with the wheels 148 and can be picked-up off plate 140b.

The data carrier in this system is preferably made of relatively stiff sheet material, e.g. thick card, or a plastics material if such composition and/or thickness is to provide reliable meshing and drive and it at least has command tracks presenting a surface capable of receiving a marking, e.g. by pencil, felt-tipped pen or other conveniently available writing instrument.

Figure 6:
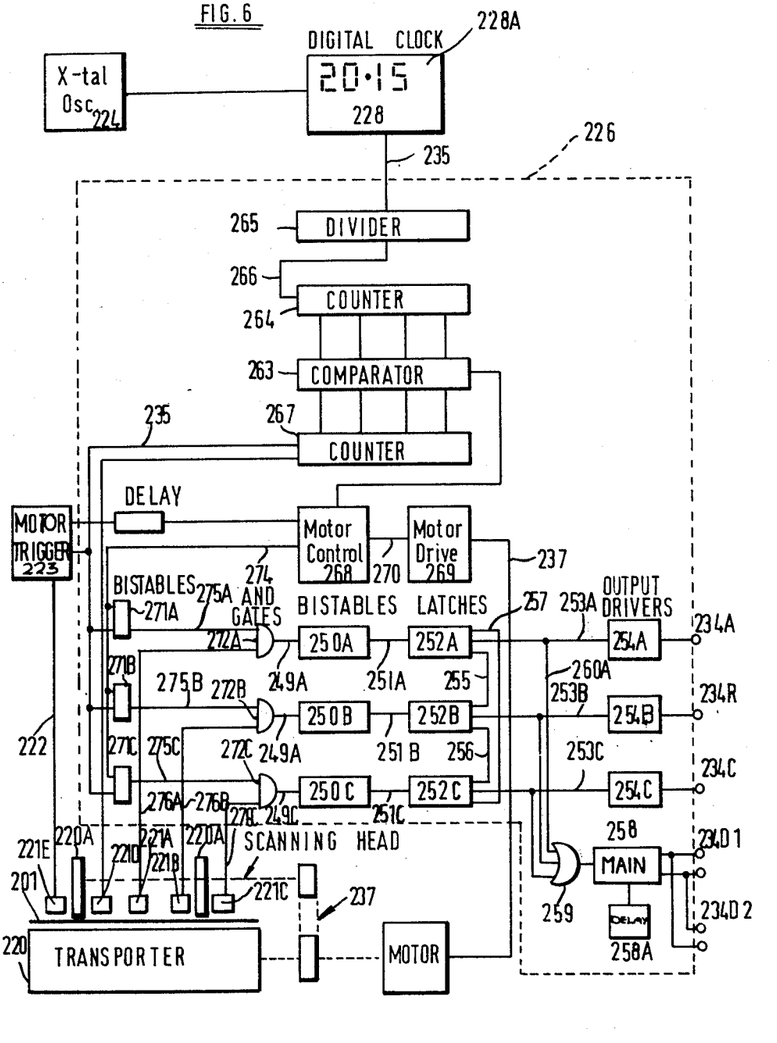
FIG. 6 shows a further embodiment of the apparatus for which the data carrier of FIG. 4 is also suitable.

Referring now to FIG. 6 showing a form of control apparatus for which the data carrier of FIG. 1 is suitable, parts corresponding functionally to those already described are designated by like references with the prefix 200.

The differences between this control apparatus and that of FIG. 2 will best be understood by the following description which includes an explanation as to its manner of operation.

The units and circuits enclosed in the broken line boundary 226 provide for initial energisation of motor 230 upon insertion of the data carrier to advance the latter to a position such that the time scale 16 graduation mark 17 which corresponds to the (24 hour) time of day indication on display means 228a is brought into register with the row of photo-electric sensors 221E, 221D, 221A, 221B, 221C. The speed of motor operation is such that this is achieved in a short interval of time, typically 1 to 20 seconds. Thereafter the motor operates at the same speed, but stepwise, to provide for stepwise advancement of the data carrier in correspondence with the elapse of time so that, in respect of each interval between graduation marks 17 (representing typically 5 minutes), the data carrier occupies a position corresponding to the time of day at the beginning of this interval and is advanced one step on elapse of this interval.

For this purpose comparator means 263 compares the count registered in "time of day" counter 264 connected through conductor 235÷5 divider circuit 265 and conductor 256 to the "minute" pulse output from clock circuits of clock 228, with "data carrier position" counter 267. Operation is as follows. When the data carrier 1 is inserted sensor 221E senses the leading edge 8 or mark 6 and exciter or trigger circuit 223 resets counter 267.

The comparator provides one of two outputs, e.g. a high or "1" output, when the count registered in counter 267 is less than that in counter 226. This output sets motor control circuit 268 in a condition to enable motor drive circuit 269, which may be a thyristor drive circuit via conductor 270 and energised motor 230.

When the two counts are equal the output of comparator means 263 changes, e.g. to "0", and the motor control circuit 268 is set in a condition to disenable the motor drive circuit 269.

During this interval, i.e. when the data carrier is being continuously advanced to the correct "time of day" position, the bistable circuits 250A, 250B, 250C are effectively isolated from their respective sensors 221A, 221B, 221C by the operation of bistable circuits 271A, 271B, 271C and gate circuits 272A, 272B, 272C.

These latter gate circuits may be AND gates requiring, say, a "1" signal on each of the two input conductors 275A, 275B, 275C and 276A, 276B, 276C.

The initial reset pulse provided by exciter circuit 223 on conductor 238 operates to set bistable circuits 271A, 271B, 271C in states such that conductors 275A, 275B, 275C are all "0" and so no enabling signal can pass to 250A, 250B, 250C to set these in their second states (output "1").

The conductor 274 is connected to a point in motor control circuit 268 such that it is at "0" during motor operation.

When motor control circuit changes state to disenable motor drive circuit conductor 274 becomes "1" thereby resetting bistable circuits 271A, 271B, 271C to their first states each to provide a "1" on respective conductors 275A, 275B, 275C.

Since no further signal can be applied to the inputs of bistable circuits 271A, 271B, 271C until the mark 5 or trailing end 7 of the data carrier moves beneath sensor 21E, bistable circuits 271A, 271B, 271C remain in this state for the remainder of travel of the data carrier.

Further data carrier travel occurs in steps, each step beginning as soon as the time of day counter registers a count of one in excess of "data carrier position" counter 267.

Should any of the sensors 221A, 221B, 221C be traversed by a start command mark 118A, 118B, 118C either during the movement step or its termination, the appropriate bistable circuit 250A, 250B, 250C will be set in its second state producing, say, a "1" on the appropriate terminal 234A, 234B, 234C, and energising 234D$_1$, 234D$_2$ as already described for the apparatus shown in FIG. 4.

For simplicity, power leads from mains terminals to the motor drive circuit 269 and to the main switching circuit 258 are omitted from FIG. 6.

The motor 230 need not be a synchonous motor, in fact a D.C. motor may be used, the current in line 237 being pulsed, preferably smoothed, D.C.

Figure 7:
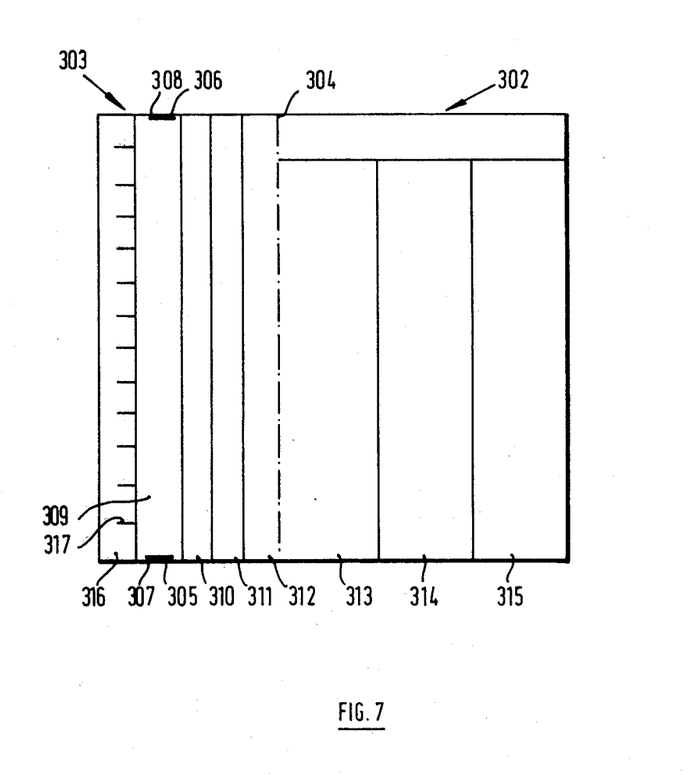
FIG. 7 shows a plan view of a further form of data carrier for use with the apparatus of FIG. 5 or FIG. 6.

FIG. 7 illustrates a data carrier in which parts corresponding to those of previously described embodiments are designated by like references with a prefix 300. In this form the time track 316 and command tracks 310, 311, 312 and start/stop track 309 on the one hand are detachably united to a portion 302 of the sheet on which the information tracks are printed as at 313, 314, 315. For this purpose the sheet is perforated along a line 304. Only the portion 303 to the left of the perforated part 304 need be loaded into the apparatus. Alternatively only the portion 303 may be provided, the time scale 317 being marked with the times of day to enable the user to mark the command tracks by reference to a separate printed programme showing what programme items are to be transmitted with details of times and channels.

Figure 8:
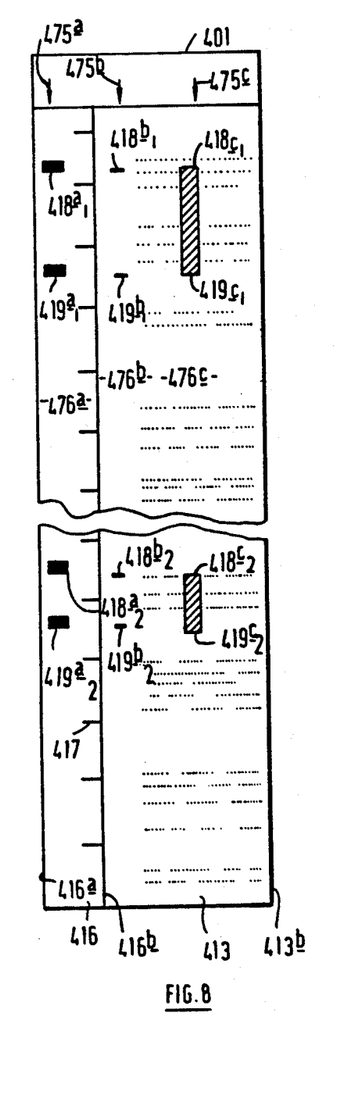
FIG. 8 shows a plan view of a further form of data carrier in accordance with the invention for carrying out the method thereof.

FIG. 8 illustrates a data carrier in which parts corresponding to those of previously described embodiments are designated by like references with the prefix 400. In this form of data carrier a separately defined command track, that is defined by laterally spaced longitudinally extending boundary lines, is not provided by the arrangement of index means 417 in the time track 416 or the arrangement of items of programme data in the information track 413 is so contrived as to enable one or the other of these tracks also to carry command markings made by the user.

Referring to the time track 416 it will be noted that it is defined by lateral boundaries namely the edge 416a and 416b but part only of the width of the time track between these boundaries is occupied by the index means 417 leaving a free or clear zone 476a.

This free or clear zone is available for the user's markings of which two pairs are shown 418a$_1$ 419a$_1$ and 418a$_2$ 419a$_2$.

To assist the user in placement of these markings indicator means such as an arrow 475a is provided on the data carrier conveniently at the head of the free or clear zone and may be accompanied by an instruction such as "mark here".

As an alternative, or additionally, a further free or clear zone 476b may be left along the left hand margin of the information track 430 since the programme items occupy part of the width between right hand boundary 413b and a common boundary 416b between information and time tracks.

Of course, it will be appreciated that it is not essential to provide a boundary line such as 416b and this may be omitted if desired.

A data carrier such as that shown in FIG. 8 may of course embody information tracks pertaining to more than one channel. In this case a command marking as would preferably occupy the zone 475b in respect of each channel.

As a possible alternative the markings may be placed in overlapping relation with the items of programme data in the zone 475c. The two markings are shown as typical starting in the first case at 418c$_1$ and ending at 419c$_1$ whereas the other marking starts at 418c$_2$ and ends at 419c$_2$. In this case the markings would be in a medium which is sensed by the sensors such as the photo-electric sensors already mentioned. Coloured marking ink or a pencil may be employed which does not obliterate programme data but leaves this readable for the user. The start and the end of each such marking would of course be made accurately in relation to the index marks of the time track rather than the text of programme data each item of which may conform only approximately to the start and end of the programme concerned, although taken collectively the items of programme data are in the correct order and occupy spaces which are generally in conformity with the programme times with reference to the time track.

Figure 9:
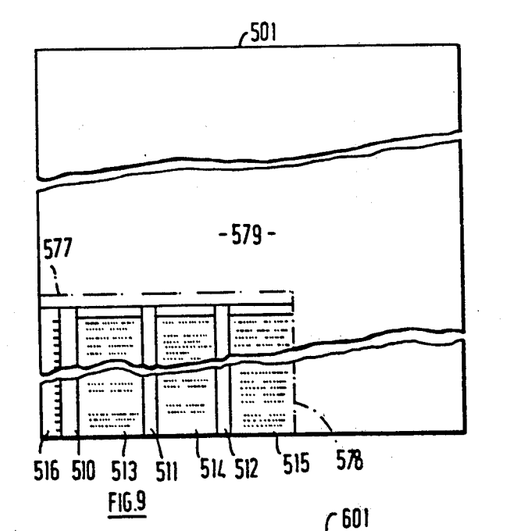
FIG. 9 shows a plan view of a data carrier of the form shown in FIG. 1 embodied as part of a page of a newspaper or journal.

FIG. 9 illustrates a data carrier in which parts corresponding to those of previously described embodiments are designated by like references with the prefix 500. In this form the data carrier is embodied in a page 579 of a newpaper or journal.

The portion of such page which is marked out in accordance with the data carrier requirements may be connected with the remainder of the page along the zones 577 and 578 where the paper is perforated or otherwise weakened to form a readily rupturable connecting means. This enables the user to detach the portion bearing the data carrier marking or insertion into the apparatus previously described. It is not essential, however, that such readily rupturable connecting means be provided since a user can cut or tear along the lines 577 and 578.

The form of data carrier embodied in the newspaper or journal page shown in FIG. 9 may be that illustrated in FIG. 1 where there is provided in association with each information track 413, 414 and 415 an associated command track 510, 511, 512 respectively and a common time track 516 is provided.

Figure 10:
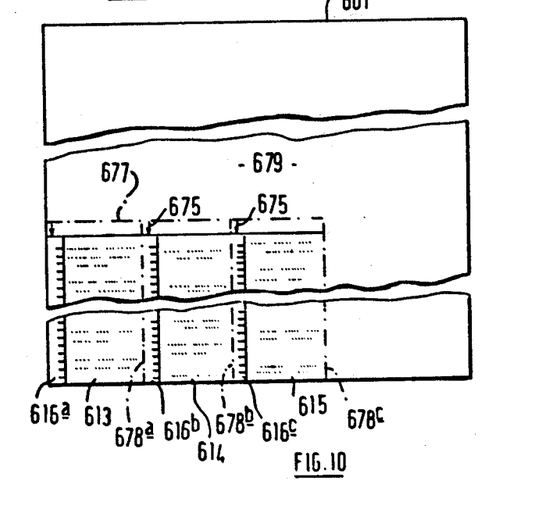
FIG. 10 is a view similar to FIG. 9 but showing a data carrier of the form shown in FIG. 8.

Alternatively as shown in FIG. 10 in which parts corresponding to those of previously described embodiments are designated by like references with the prefix 600 the data carrier may be of the form illustrated in FIG. 8. Thus, for each information track pertaining to a particular channel 613, 614, 615 an individual time track 616a, 616b, 616c is provided and a free or clear zone of such time track may be utilized as indicated by arrows 675 for reception of users markings. Alternatively users marking in the zones indicated by arrows 475b, 475c (FIG. 8) could be applied, such being omitted from FIG. 10 for the sake of simplicity.

The three sections of the data carrier portion of the page may be detached collectively from the remainder of the page 679 along lines 677 and 678c as for the embodiment of FIG. 9. Alternatively the three sections of the portion of the page which forms the data carrier may be detachable individually along lines 678a and 678b along which sheet may if desired be perforated to form a readily rupturable connecting means as already described.

It will, of course be understood that various modifications may be made without departing from the scope of the invention. The following are specific but not exhaustive.

The time of day clock means and the data carrier may be adapted respectively by provision of suitable counting circuits and display to cover a period of longer than one day, e.g. one week or even more. The expression "time of day" is used generically to denote an instant of time within one 24 hour or whatever longer period may be selected as suitable for the purposes of the invention and includes night time periods.

Scanning can be effected utilising a stationary data carrier support means and a movable scanning head driven by the motor already described.

Alternatively strip arrays of sensors such as phototransistors may be stationarily imaged relative to respective areas along each command track and/or time track and may be scanned electronically to sample their outputs sequentially.

Any of the circuits or units shown in FIGS. 2, 4 or 6 may be built up of separate components or may be in the form of integrated circuit units.

The motor means may be rotary or reciprocatory, in the latter case comprising pawl or finger means to advance the data carrier.

Further, the control apparatus may be made as a separate unit or combined with a recording apparatus for television or radio receivers to form a unit therewith.

I claim:

1. A television and/or radio receiver recorder data carrier comprising a sheet having:

a. at least one information track defined by sequentially arranged intellectually visually readable items of data pre-applied in their totality identifying a sequence of television and/or radio programmes to be transmitted over a channel pertaining to that track and occupying respective spaces having dimensions lengthwise of said track in general conformity with the durations of the respective programmes with which the respective items of data are concerned, b. a time track having a sequence of index means along said time track representing the elapse of time, c. means indicating the lateral position of a zone extending longitudinally of at least one of said tracks for receiving a machine readable users marking controlling operation of a receiver recorder and delineating selected ones of said items and hence selecting ones of said programmes.

2. A data carrier according to claim 1 wherein said indicating means comprises an indicator mark located intermediate lateral boundaries of the information track.

3. A data carrier according to claim 1 wherein, said time track has lateral boundary means defining its width, said index means occupies part only of said width leaving a free zone not occupied by said index means, and said indicator mark is situated in longitudinal alignment with said free zone.

4. A data carrier according to claim 2 wherein said information track has lateral boundary means defining its width, said items of data occupy part only of said width leaving a free zone not occupied by said items, and said indicator mark is situated in longitudinal alignment with said free zone.

5. A television and/or radio recorder data carrier comprising a sheet of a newspaper or journal a portion whereof has:

a. at least one information track defined by sequentially arranged intellectually visually readable items of data pre-applied in their totality identifying a sequence of television and/or radio programmes to be transmitted over a channel pertaining to that track and occupying respective spaces having dimensions lengthwise of said track in general conformity with the durations of the respective programmes with which the respective items of data are concerned, b. a time track having a sequence of index means along said time track representing the elapse of time, c. means defining at least one command track extending lengthwise of said time and information tracks for receiving a machine readable users marking controlling operation of a receiver recorder appropriately positioned to select at least one of said items of data and hence the programme to which said item identifies.

6. A data carrier according to claim 5 wherein said sheet includes connecting means more readily rupturable than said sheet and connecting said portion with the remainder of said sheet.

7. A television and/or radio recorder data carrier comprising a sheet of a newspaper or journal portion whereof has:

a. at least one information track defined by sequentially arranged intellectually visually readable items of data pre-applied in their totality identifying a sequence of television and/or radio programmes to be transmitted over a channel pertaining to that track and occupying respective spaces having dimensions lengthwise of said track in general conformity with the durations of the respective programmes with which the respective items of data are concerned, b. a time track having a sequence of index means along said time track representing the elapse of time, c. means indicating the lateral position of a zone extending longitudinally of at least one of said tracks for receiving a users machine readable marking controlling operation of a receiver recorder and delineating selected ones of said items and hence selecting one of said programmes.

8. A data carrier according to claim 7 wherein said sheet includes connecting means more readily rupturable than said sheet connecting said portions with the remainder of said sheet.

* * * * *